(12) United States Patent
Hosokawa

(10) Patent No.: US 7,725,610 B2
(45) Date of Patent: May 25, 2010

(54) DATA PROCESSING APPARATUS THAT TRANSMITS AND RECEIVES MOVING IMAGE DATA TO AND FROM AN EXTERNAL DEVICE THROUGH A TRANSMISSION PATH

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/126,597

(22) Filed: May 11, 2005

(65) Prior Publication Data

US 2005/0253931 A1 Nov. 17, 2005

(30) Foreign Application Priority Data

May 13, 2004 (JP) ............................. 2004-143812

(51) Int. Cl.
*G06F 3/00* (2006.01)
*H04N 5/225* (2006.01)

(52) U.S. Cl. ............... 710/6; 710/5; 710/33; 710/35; 710/100; 710/104; 348/207.1

(58) Field of Classification Search ............... 710/62, 710/5, 6, 33, 35, 100, 104; 348/207.1
See application file for complete search history.

(56) References Cited

U.S. PATENT DOCUMENTS

| 6,049,353 | A  | * | 4/2000  | Gray .......................... 348/159 |
| 6,157,975 | A  | * | 12/2000 | Brief et al. .................. 710/104 |
| 6,188,440 | B1 |   | 2/2001  | Toujima et al. ............. 348/554 |
| 6,279,053 | B1 |   | 8/2001  | Kubo ........................... 710/30 |
| 6,538,675 | B2 | * | 3/2003  | Aratani et al. ............. 715/856 |
| 6,704,310 | B1 | * | 3/2004  | Zimmermann et al. ...... 370/389 |
| 7,409,471 | B2 | * | 8/2008  | Saito et al. ................. 710/35 |
| 7,424,558 | B2 | * | 9/2008  | Kobayashi ................. 710/62 |

| 2002/0057682 | A1 | * | 5/2002  | Hansen et al. .............. 370/386 |
| 2003/0020757 | A1 | * | 1/2003  | Aratani et al. ............. 345/790 |
| 2003/0179192 | A1 | * | 9/2003  | Allen et al. ................. 345/207 |
| 2003/0200360 | A1 | * | 10/2003 | Saito et al. ..................... 710/5 |

(Continued)

FOREIGN PATENT DOCUMENTS

EP 903737 A1 3/1999

(Continued)

OTHER PUBLICATIONS

'Universal Serial Bus Specification' Revision 2.0, by Compaq et al., Apr. 27, 2000.*

(Continued)

*Primary Examiner*—Henry W. H. Tsai
*Assistant Examiner*—Steven G Snyder
(74) *Attorney, Agent, or Firm*—Canon USA Inc IP Division

(57) ABSTRACT

A data processing apparatus transmits and receives moving image data to and from an external device through a transmission path. A first pipe used for transferring the moving image data and a second pipe used for transferring timing information relating to the processing timing of the moving image data are provided on the transmission path. The moving image data is being transferred to the external device through the first pipe in parallel with the timing information relating to the moving image data being transferred through to the external device through the second pipe.

12 Claims, 14 Drawing Sheets

|           | Type           | Intended use                          |
|-----------|----------------|---------------------------------------|
| Endpoint0 | Control In/Out | Common instruction                    |
| Endpoint1 | Isochronous In | Transfer of up-stream data            |
| Endpoint2 | Isochronous In | Transfer of frame frequency of USB device |

U.S. PATENT DOCUMENTS

| | | | |
|---|---|---|---|
| 2004/0017486 A1* | 1/2004 | Cooper et al. | 348/211.1 |
| 2004/0088445 A1* | 5/2004 | Weigold et al. | 710/8 |
| 2004/0148446 A1* | 7/2004 | Katsch | 710/104 |
| 2004/0221077 A1* | 11/2004 | Yen | 710/100 |
| 2005/0024505 A1* | 2/2005 | Kawachi | 348/231.3 |
| 2005/0066085 A1* | 3/2005 | Kobayashi | 710/62 |
| 2005/0240689 A1* | 10/2005 | Leaming | 710/52 |
| 2006/0170779 A1* | 8/2006 | Tanabe | 348/207.99 |

FOREIGN PATENT DOCUMENTS

| | | |
|---|---|---|
| EP | 1049333 A1 | 11/2000 |
| JP | 2003-179662 A | 6/2003 |
| WO | 01/78400 | 10/2001 |

OTHER PUBLICATIONS

USB Implementers Forum: "Universal Serial Bus Device Class Definition for Video Devices Revision 1.0a" Nov. 2003.

IEEE ED—Institute of Electrical and Electronics Engineers: "IEEE Standard for High Performance Serial Bus" IEEE Standard for a High Performance Serial Bus. IEEE STD 1394-1995, New York, NY: IEEE, Jan. 1995.

* cited by examiner

FIG. 3

| | Type | Intended use |
|---|---|---|
| Endpoint0 | Control In/Out | Common instruction |
| Endpoint1 | Isochronous In | Transfer of up-stream data |
| Endpoint2 | Isochronous In | Transfer of frame frequency of USB device |

FIG. 8

| Type | Intended use |
|---|---|
| Endpoint0 | Control In/Out | Common instruction |
| Endpoint1 | Isochronous Out | Transfer of down-stream data |
| Endpoint2 | Isochronous In | Transfer of frame frequency of USB device |

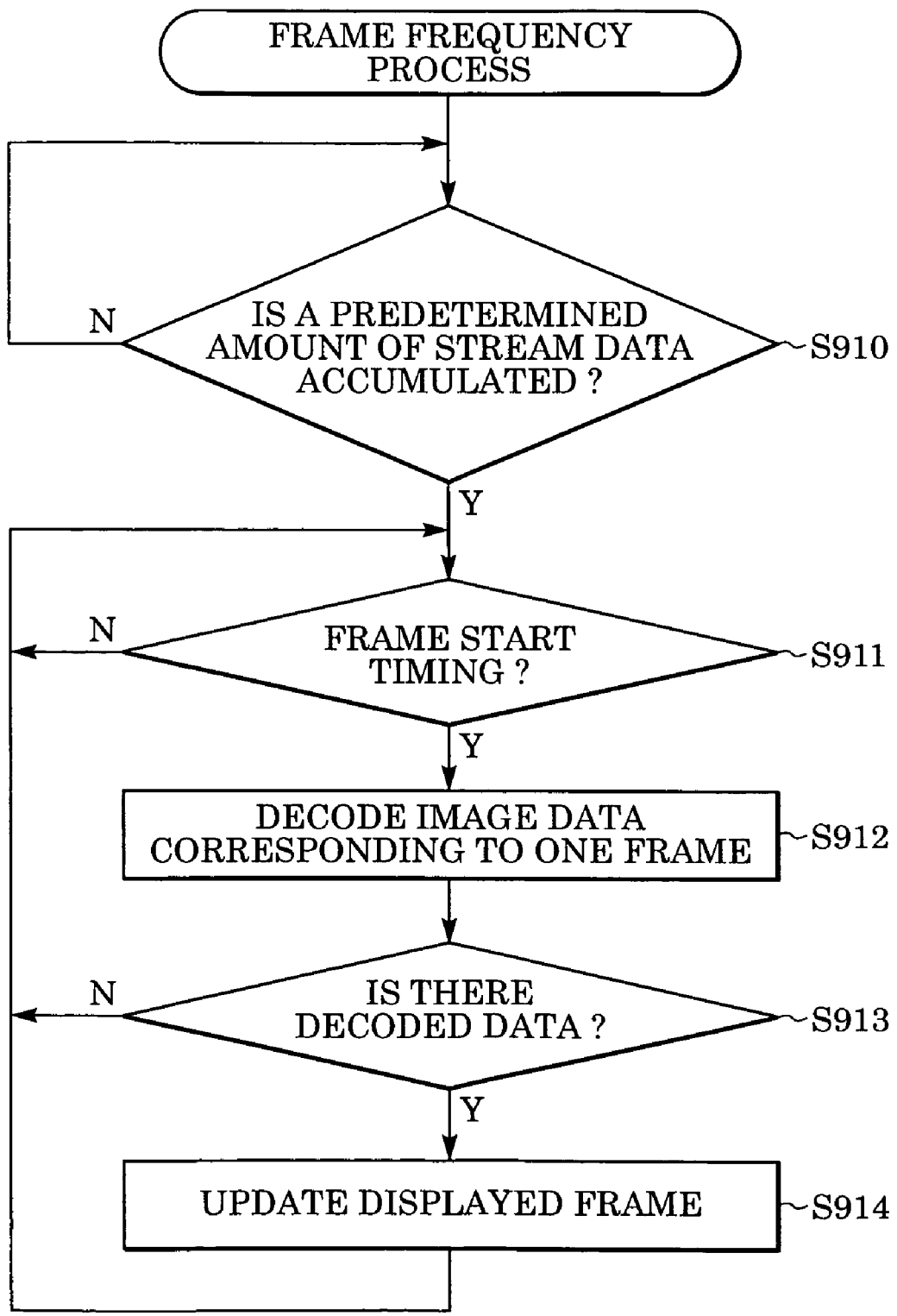

US 7,725,610 B2

DATA PROCESSING APPARATUS THAT TRANSMITS AND RECEIVES MOVING IMAGE DATA TO AND FROM AN EXTERNAL DEVICE THROUGH A TRANSMISSION PATH

BACKGROUND OF THE INVENTION

1. Field of the Invention

The present invention relates to a data processing apparatus and, more particularly, to an apparatus that transmits and receives data to and from an external device.

2. Description of the Related Art

A data communication system used in data transmission and reception between different media in accordance with sampling rates based on different system clocks is disclosed in, for example, Japanese Patent Laid-Open No. 2003-179662. In this data communication system, the difference between the clock of a master and the clock of a slave is calculated based on the received packet timestamp, and a transfer-rate change message having the calculated value as the data for changing the transfer rate is generated and the generated message is transmitted to the slave. The slave absorbs the difference in clock between the master and the slave by changing the transfer rate in accordance with the transfer-rate change message in order to avoid buffer over-run and buffer under-run.

However, known transfer interfaces in which the slave responds to a transfer request from the master, as in a universal serial bus (USB) interface, and in which the packet size cannot be arbitrarily reset for every packet cannot completely avoid the buffer over-run and under-run.

SUMMARY OF THE INVENTION

It is desirable to provide an apparatus capable of easily avoiding buffer over-run and under-run of transferred data in USB connection and of transferring image data in real time.

In accordance with a first aspect of the present invention, a data processing apparatus transmits and receives moving image data to and from an external device through a transmission path. The data processing apparatus provides, on the transmission path, a first pipe used for transferring the moving image data and a second pipe used for transferring timing information relating to the processing timing of the moving image data. The moving image data is transferred to the external device through the first pipe on the transmission path in parallel with the timing information relating to the moving image data being transferred to the external device through the second pipe on the transmission path.

In accordance with a second aspect of the present invention, a data transfer system includes a host device, a slave device, and a transmission path through which moving image data is transferred between the host device and the slave device. A first pipe used for transferring the moving image data and a second pipe used for transferring timing information relating to the processing timing of the moving image data are provided on the transmission path. The moving image data is being transferred through the first pipe on the transmission path in parallel with the timing information relating to the moving image data being transferred through the second pipe on the transmission path.

According to a third aspect of the present invention, a data processing apparatus transmitting moving image data to a host device through a USB interface includes a first endpoint transmission unit that sets a first endpoint for isochronous transmission via the USB interface and transmits the moving image data from the data processing apparatus to the host device at the first endpoint, and a second endpoint transmission unit that sets a second endpoint for isochronous transmission via the USB interface and transmits timing information indicating a frame period of the moving image data from the data processing apparatus to the host device at the second endpoint. The first endpoint transmission unit transmits the moving image data from the data processing apparatus to the host device at the first endpoint in parallel with the second endpoint transmission unit transmitting the timing information indicating the frame period of the moving image data from the data processing apparatus to the host device at the second endpoint.

Further features and advantages of the present invention will become apparent from the following description of exemplary embodiments with reference to the attached drawings.

BRIEF DESCRIPTION OF THE DRAWINGS

FIG. 3 shows the structure of endpoints of a USB controller in the digital video camera according to the first embodiment.

FIG. 8 shows the structure of endpoints of a USB controller in the digital video camera according to the second embodiment.

FIGS. 9A to 9C are flowcharts illustrating the operation of the digital video camera according to the second embodiment.

DESCRIPTION OF THE EMBODIMENTS

Embodiments of the present invention are described below with reference to the attached drawings.

A system for transferring moving image data captured by a digital video camera to a personal computer to perform streaming playback according to a first embodiment of the present invention is described next.

Figure 1:
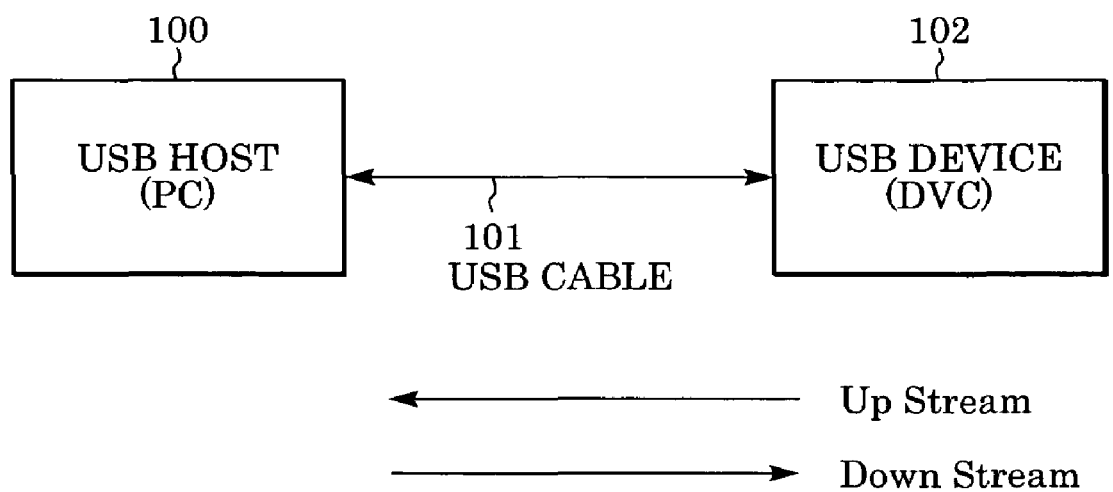
FIG. 1 is a block diagram showing the structure of a transmission system in which a personal computer is connected to a digital video camera according to a first embodiment of the present invention.

FIG. 1 is a block diagram showing the structure of a system in which a personal computer 100 is connected to a digital video camera (DVC) 102 according to the first embodiment of the present invention. Referring to FIG. 1, the personal computer 100 serves as a USB host. The digital video camera 102 is a USB device having a USB port. The personal computer 100 is directly connected to the digital video camera 102 through a USB cable 101. Moving image and sound data that are being captured by the digital video camera 102 are transferred to the personal computer 100 as stream playback data.

The transfer direction of the data from the digital video camera 102 to the personal computer 100 is called an upstream direction and that from the personal computer 100 to the digital video camera 102 is called a downstream direction. It is assumed that the digital video camera 102 according to the first embodiment has a streaming function in the upstream direction.

Figure 2:
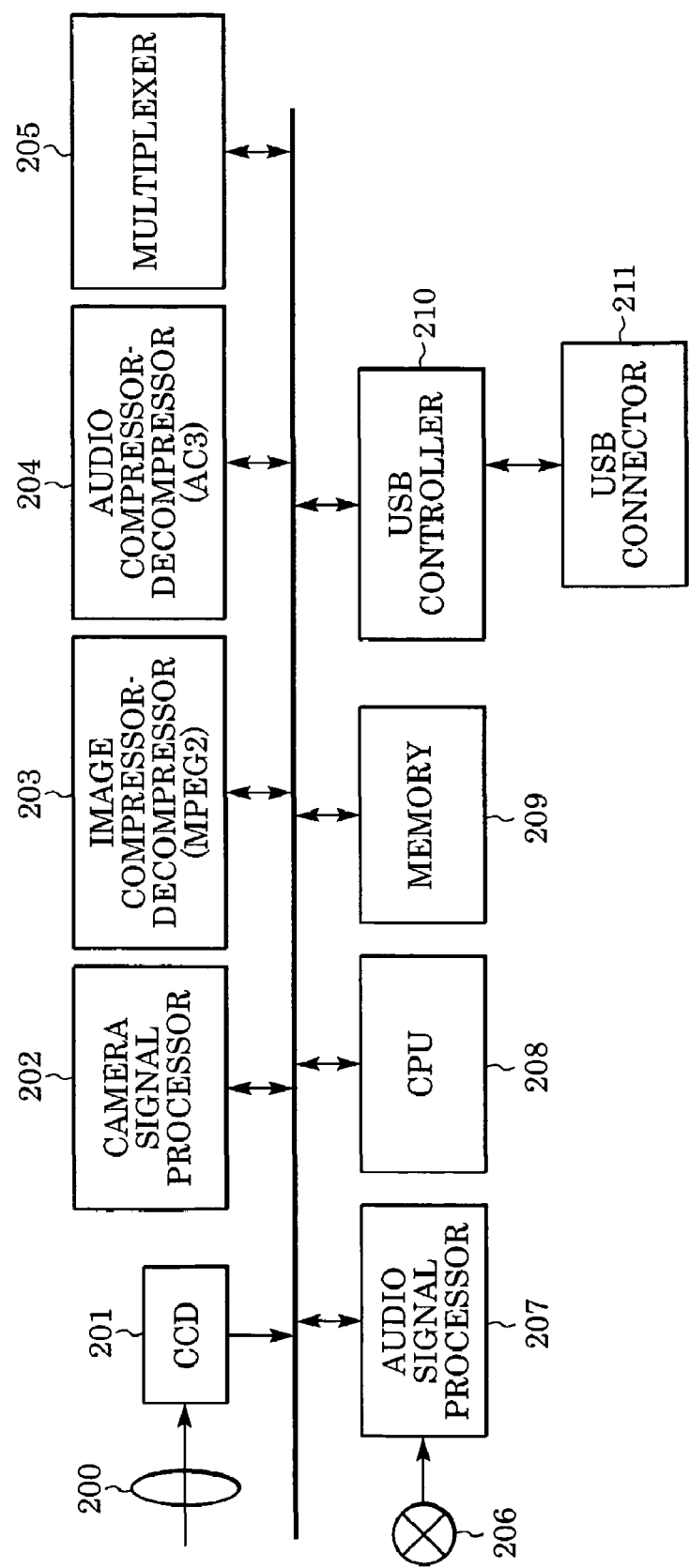
FIG. 2 is a block diagram showing the structure of the digital video camera according to the first embodiment.

FIG. 2 is a block diagram showing the structure of the digital video camera 102 according to the first embodiment of the present invention. Referring to FIG. 2, the digital video camera 102 includes a lens 200 through which light reflected from an object passes, an imager (charge coupled device (CCD)) 201, a camera signal processor 202, an image compressor-decompressor 203, and an audio compressor-decompressor 204. The imager 201, on which the lens 200 forms an image of the object, outputs an electrical signal corresponding to the formed image. The camera signal processor 202 performs signal processing so as to convert the electrical signal, which is subjected to photoelectric conversion in the imager 201 and which is supplied from the imager 201, into an image signal. The image compressor-decompressor 203 encodes and compresses the image signal to generate an MPEG2-compliant (MPEG is an abbreviation of moving picture experts group) image data and sets a maximum bit length of one frame in the encoding. The audio compressor-decompressor 204 compresses an audio signal supplied from a microphone 206 to generate, for example, AC3-compliant (AC3 is an abbreviation of audio code number 3) audio data.

The digital video camera 102 also includes a multiplexer 205. The multiplexer 205 multiplexes the image data and the audio data supplied from the image compressor-decompressor 203 and the audio compressor-decompressor 204, respectively, to generate a data stream in an MPEG2-transport stream (MPEG2-TS) format.

The digital video camera 102 further includes the microphone 206, an audio signal processor 207, a central processing unit (CPU) 208, a memory 209, a USB controller 210, and a USB connector 211. The microphone 206 is used for capturing sound. The audio signal processor 207 performs signal processing for the audio signal supplied from the microphone 206. The CPU 208 controls the digital video camera 102 in accordance with a control program stored in the memory 209, which temporarily stores the image data and the audio data. The USB connector 211 is used for connecting and disconnecting the digital video camera 102 to and from the USB cable 101.

FIG. 3 shows the structure (first-in first-out (FIFO) method for USB transfer) of endpoints of the USB controller 210 in the digital video camera 102 according to the first embodiment. An endpoint is a source or destination register of transmitted data which can be viewed as an interface between the hardware and firmware running on a device. An endpoint 0, which is a default control endpoint of a USB device, is used to perform negotiation when the USB device is connected and to transmit and receive an instruction to start streaming etc. An endpoint 1 is an isochronous endpoint used for transferring the MPEG2-TS upstream data. An endpoint 2 is an isochronous endpoint used for transmitting the frame frequency of the digital video camera 102 to the personal computer 100. Communication with a USB device is accomplished through a pipe which is a logical association between an endpoint and software running on the host device. The USB device sends and receives data on a series of endpoints, the data being transferred through pipes. Here, a first pipe accomplishes communication associated with the first endpoint (i.e., transferring the MPEG2-TS upstream data) and a second pipe accomplishes communication associated with the second endpoint (i.e., transferring the frame frequency of the digital video camera).

Figure 4A:
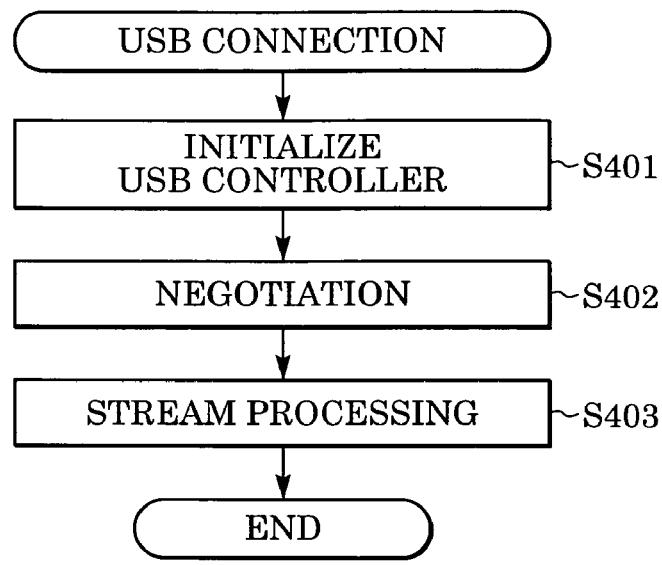
FIGS. 4A to 4C are flowcharts illustrating the operation of the digital video camera according to the first embodiment.
Figure 4B:
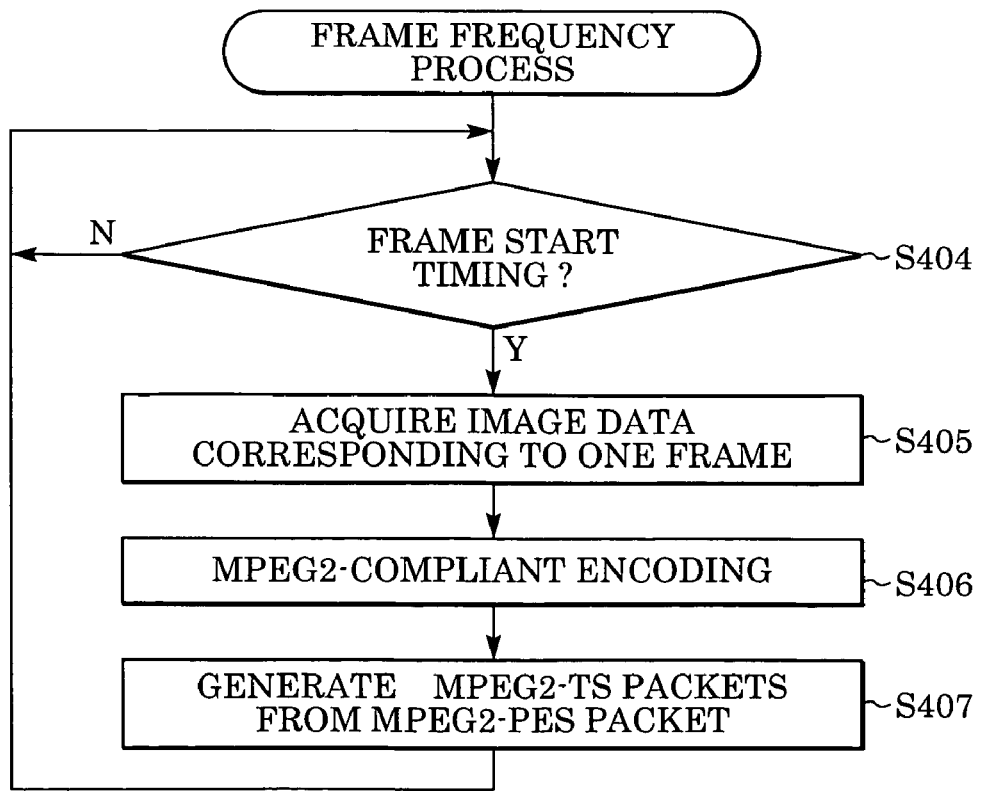
Figure 4C:
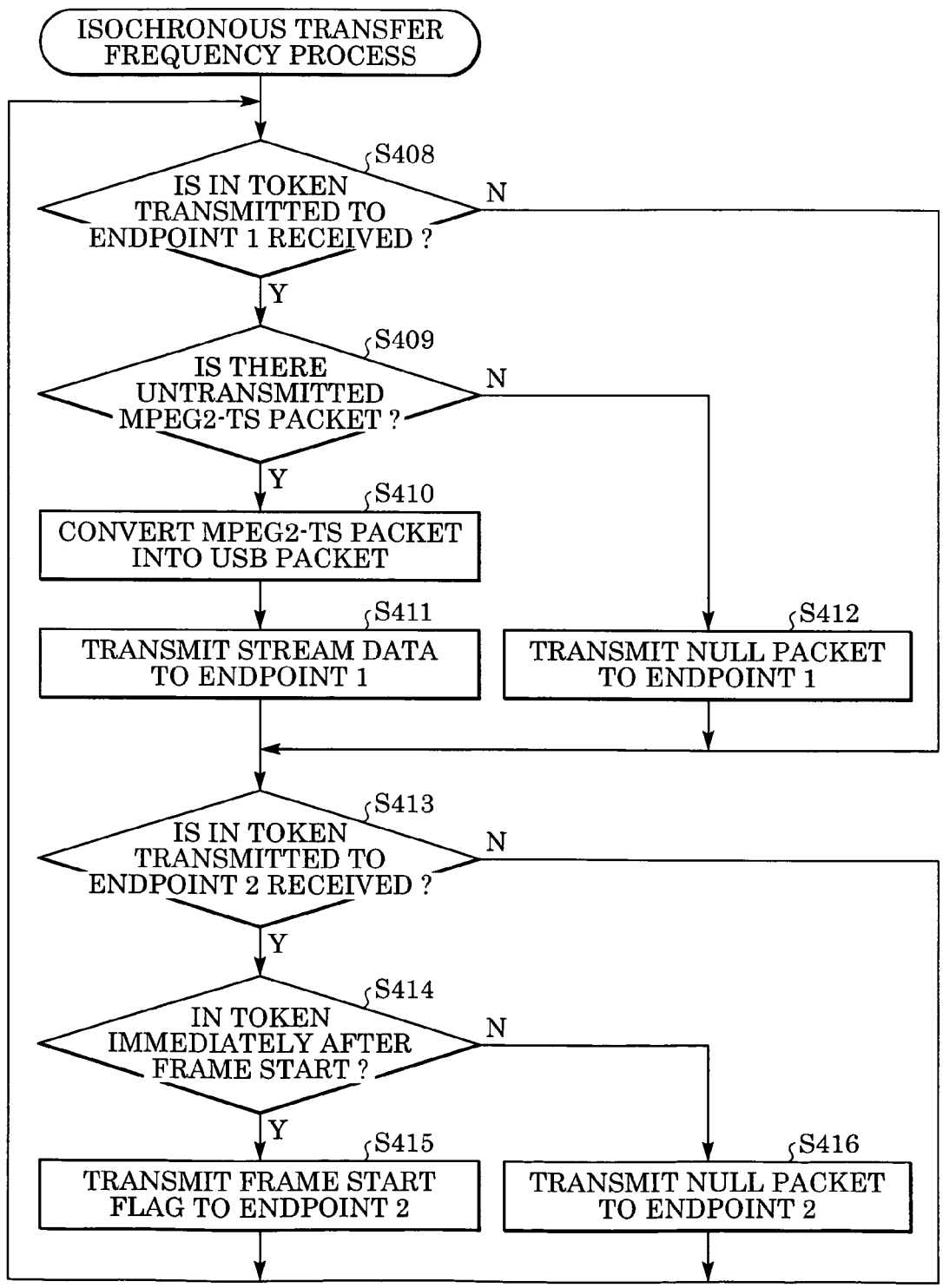

FIGS. 4A to 4C are flowcharts showing streaming processes of the digital video camera 102. The streaming processes are described below with reference to FIGS. 2 and 4A to 4C. Upon startup, a compressed program stored in a flash memory (not shown) is decompressed and extracted in the memory 209. The CPU 208 operates in accordance with the program stored in the memory 209.

A USB connection process is described next with reference to FIG. 4A.

When the USB cable 101 is connected to the USB connector 211, the process in FIG. 4A is started. In Step S401, the USB controller 210 detects the connection to the USB cable 101 and notifies the CPU 208 of the connection to the USB cable 101. The CPU 208 performs initialization necessary for the USB controller 210 and, then, controls the USB controller 210 to perform pull-up connection to the personal computer 100.

In Step S402, the personal computer 100, which is a USB host and which is pull-up connected to the digital video camera 102 being a USB device, enters into negotiation with the digital video camera 102. The digital video camera 102, which receives a negotiation request, creates descriptor information (USB connection information) in accordance with the connection mode shown in FIG. 3 in the memory 209 and transfers the descriptor information in response to the negotiation request from the personal computer 100.

In the negotiation, the digital video camera 102, which is a USB device, notifies the personal computer 100, which is a USB host, of a buffer size necessary for a decoder (not shown) in the personal computer 100. The buffer size is calculated in the following manner. When the stream data includes an intra frame (hereinafter referred to as I frame) and a predictive frame (hereinafter referred to as P frame), the buffer size=a maximum bit length of one frame×1. When the stream data includes the I frame, the P frame, and a bidirectional predictive frame (hereinafter referred to as B frame), the buffer size=a maximum bit length of one frame×(the number of times the B frame continuously occurs+1).

In Step S403, the personal computer 100 issues a Set_Interface command upon start of the streaming to change an Alternate setting and notifies the digital video camera 102 of the start of the streaming.

The digital video camera 102, which is notified of the start of the streaming, performs in parallel an encoding process in accordance with the frame frequency, shown in FIG. 4B, and a transfer process in accordance with the frequency of USB isochronous transfer, shown in FIG. 4C. The digital video camera 102 repeats the parallel processing until it is notified of the end of the streaming by the personal computer 100 with the Set_Interface command.

The encoding process in accordance with the frame frequency is described next with reference to FIG. 4B.

An image of an object, formed through the lens 200, is subjected to the photoelectric conversion in the imager 201 to generate an electrical signal, which is supplied to the camera signal processor 202. The camera signal processor 202 converts the electrical signal into a moving image signal, which is temporarily stored in the memory 209. In Step S404, the digital video camera 102 determines whether it is time to start a frame. If it is time to start a frame, in Step S405, the digital video camera 102 acquires the image data corresponding to one frame from the moving image signal stored in the memory 209. In Step S406, the digital video camera 102 performs image compression and encoding conforming to the MPEG2 standard in the image compressor-decompressor 203, and temporarily stores the MPEG2 data in a different area from the area where the moving image signal is stored in the memory 209.

An audio signal supplied from the microphone 206 is subjected to signal processing in the audio signal processor 207, and the processed audio signal is temporarily stored in the area, in the memory 209, for storing the audio signal. The stored audio signal is then subjected to audio compression and encoding in the audio compressor-decompressor 204 to generate AC3-compliant data. The generated AC3-compliant data is temporarily stored in a different area from the area where the audio signal is stored in the memory 209.

The encoded image data and audio data is multiplexed in the multiplexer 205 to generate an MPEG2-PES (PES is an abbreviation of packetized elementary stream) packet.

In Step S407, the CPU 208 divides the MPEG2-PES packet in the memory 209 into fixed-length sections each having 188 bytes to generate an MPEG2-TS packet. Repeating the division allows the MPEG2-TS packets for the streaming to be sequentially generated in the memory 209. In the MPEG2-TS format, decoding timestamp (DTS) and presentation timestamp (PTS) for synchronization between the encoder side and the decoder side are included in the stream. These timestamps represent values of a counter for counting 27-MHz clocks. Ordinarily, a program clock reference (PCR) indicating a value for presetting the counted value of the clocks is periodically included in the stream in the MPEG2-TS format. Presetting the value of the counter with the value of the PCR at the decoder side allows the decoding timing at the encoder side to be limited.

However, since the transmission is performed without the PCR data being included when the MPEG2 stream is transmitted through the USB interface, the MPEG data received in accordance with the counted value of free-running clocks is decoded at the decoder side, or in the personal computer 100.

Accordingly, according to the first embodiment, the endpoint 2 is used to transmit the information concerning the frame period of the MPEG2-TS data being transferred in the digital video camera 102.

The transfer process in accordance with the frequency of USB isochronous transfer is described next with reference to FIG. 4C.

After the streaming is started, the personal computer 100 issues the Set_Interface command to the digital video camera 102 and, then, transmits IN tokens (data transfer instructions) to the endpoint 1 used for transferring the upstream data and to the endpoint 2 used for transferring the frame frequency at predetermined intervals.

In Step S408, the CPU 208 determines whether the USB controller 210 receives the IN token transmitted from the personal computer 100 to the endpoint 1. If it is determined in Step S408 that the USB controller 210 received the IN token, then in Step S409, the CPU 208 determines whether the MPEG2-TS packet generated in Step S407 exists in the memory 209. If it is determined in Step S408 that the USB controller 210 did not receive the IN token, the process proceeds to Step S413.

If it is determined in Step S409 that the MPEG2-TS packet exists in the memory 209, then in Step S410, the CPU 208 performs predetermined processing necessary for the USB transmission for the MPEG2-TS packet to convert the MPEG2-TS packet to a USB packet. In Step S411, the CPU 208 causes the USB controller 210 to transmit the USB packet from the endpoint 1 to the personal computer 100.

If it is determined in Step S409 that the MPEG2-TS packet does not exist in the memory 209, then in Step S412, the CPU 208 causes the USB controller 210 to transmit a null packet from the endpoint 1 of the USB device to the personal computer 100.

The personal computer 100 also periodically transmits the IN token to the endpoint 2. In Step S413, the CPU 208 determines whether the USB controller 210 transmitted the IN token from the endpoint 2 to the personal computer 100. If it is determined in Step S413 that the USB controller 210 transmitted the IN token from the endpoint 2 to the personal computer 100, in Step S414, the CPU 208 determines whether the transmitted IN token is the IN token immediately after the frame start timing. If it is determined in Step S413 that the USB controller 210 did not transmit the IN token from the endpoint 2 to the personal computer 100, the process returns to Step S408.

If it is determined in Step S414 that the transmitted IN token is the IN token immediately after the frame start timing, then in Step S415, the CPU 208 transmits, from the endpoint 2 to the personal computer 100, a flag indicating that it is time to start encoding in the digital video camera 102. If it is determined in Step S414 that the transmitted IN token is not the IN token immediately after the frame start timing, then in Step S416, the CPU 208 transmits a null packet from the endpoint 2 to the personal computer 100.

Sequentially repeating the above processes allows the digital video camera 102 to transfer the streaming data and to transmit the frame frequency of the digital video camera 102 to the personal computer 100.

The operation of the personal computer 100, which is a USB host, is described below.

Figure 5A:
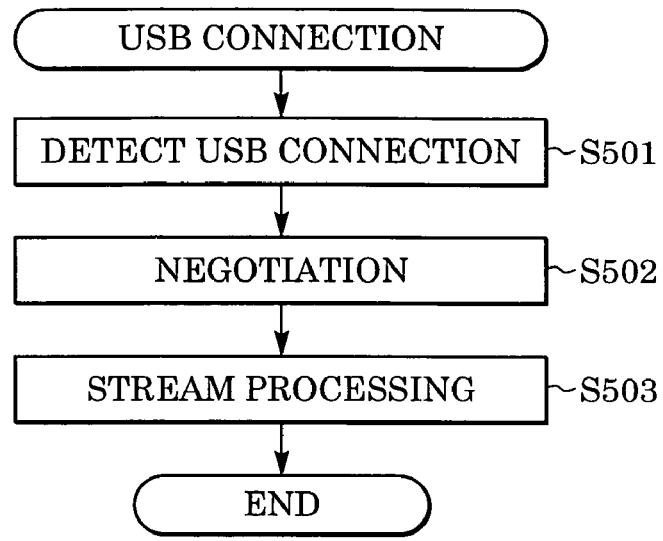
FIGS. 5A to 5C are flowcharts illustrating the operation of the personal computer according to the first embodiment.
Figure 5B:
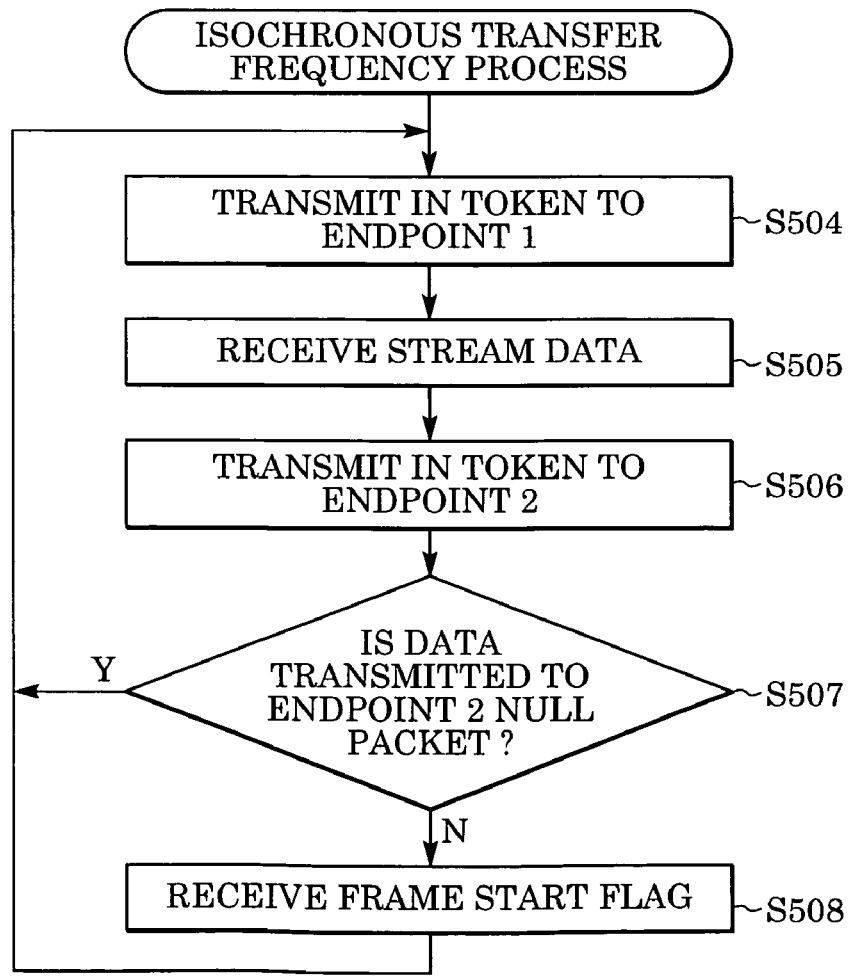
Figure 5C:
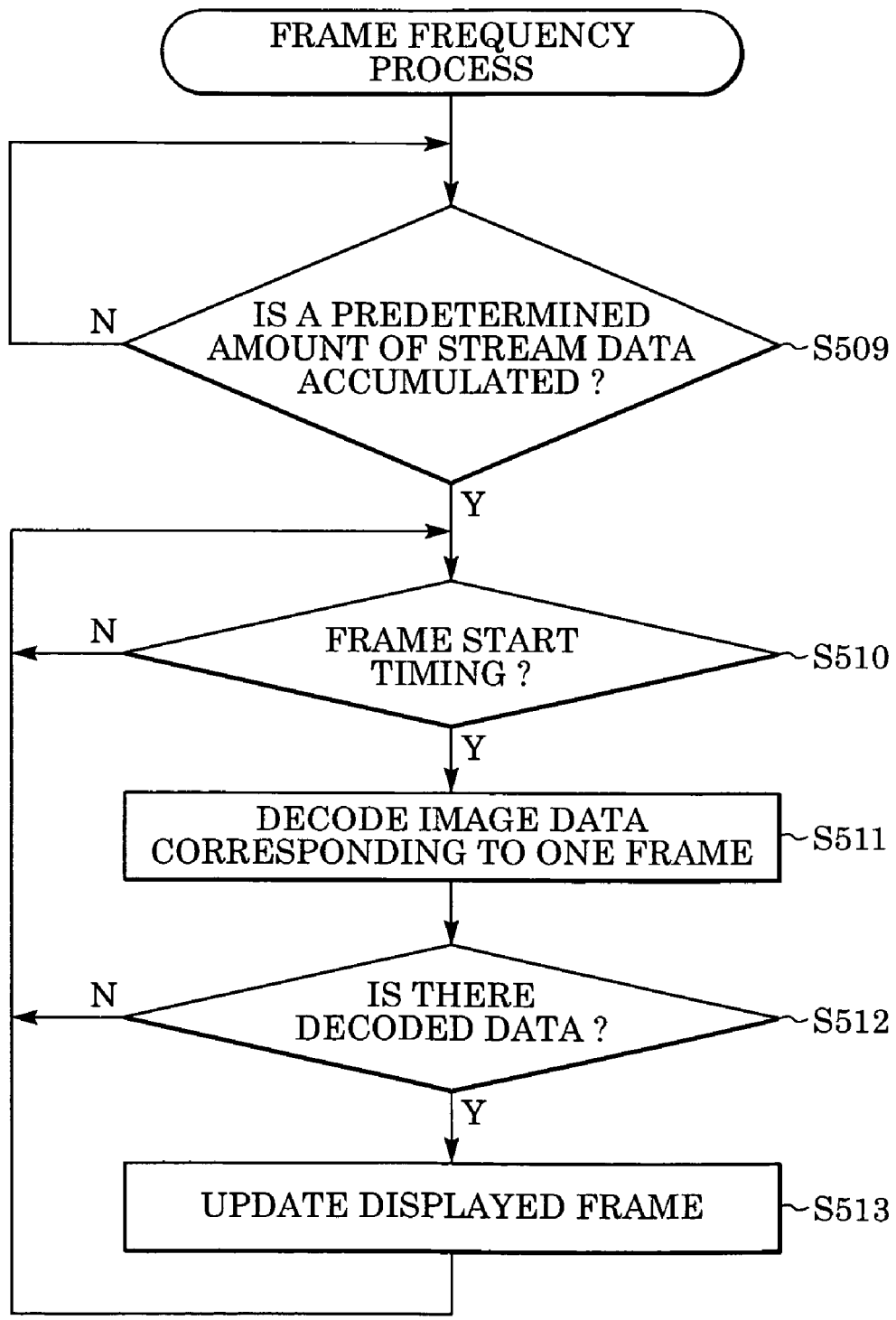

FIGS. 5A to 5C are flowcharts showing streaming processes of the personal computer 100. The operation of the personal computer 100 is described next with reference to FIGS. 5A to 5C.

Referring to FIG. 5A, when the USB cable 101 is connected to the personal computer 100, the personal computer 100 applies a voltage to a VBUS (USB power line) on the USB cable 101. In Step S501, the digital video camera 102 detects the voltage applied to the VBUS, and performs the pull-up connection to the personal computer 100. In Step S502, the personal computer 100 performs a predetermined negotiation operation. The personal computer 100 acquires the maximum bit length of one frame and the number of times the B frame continuously occurs from the digital video camera 102 and allocates a buffer size appropriate for the acquired values in a memory (not shown).

In Step S503, the personal computer 100 receives a streaming start request from an application (not shown). The personal computer 100 issues the Set_Interface command to the digital video camera 102 to notify the digital video camera 102 of the start of the streaming.

The personal computer 100, which has started the streaming, performs in parallel a process of acquiring streaming data, in accordance with the frequency of USB isochronous transfer, shown in FIG. 5B, and a process of decompressing and displaying the streaming data, in accordance with the frame frequency of the digital video camera 102, shown in FIG. 5C. The personal computer 100 repeats the parallel processing until it receives a termination request from the application (not shown).

The process of acquiring the streaming data, in accordance with the frequency of USB isochronous transfer, is described next with reference to FIG. 5B.

After the streaming is started, in Step S504, the personal computer 100 transmits an IN token to the endpoint 1 of the digital video camera 102 and attempts to acquire the streaming data from the digital video camera 102. In Step S505, the personal computer 100 receives the streaming data in the form of the USB packet from the digital video camera 102.

In Step S506, the personal computer 100 also periodically transmits the IN token to the endpoint 2 of the digital video camera 102. In Step S507, the personal computer 100 determines whether the data transmitted to the endpoint 2 in response to the IN token is null data.

If the transmitted data is null data, the process returns to Step S504. If the transmitted data is not null data, then in Step S508, the personal computer 100 acquires a frame start flag. The personal computer 100 acquires the streaming data and the information concerning the frame start timing of the digital video camera 102 from the digital video camera 102 by sequentially repeating the above process.

The process of decompressing and displaying the streaming data, in accordance with the frame frequency of the digital video camera 102, is described next with reference to FIG. 5C.

In Step S509, the personal computer 100 determines whether there is a sufficient amount of data accumulated in a memory (not shown) to start the streaming playback. This determination is based on the required amount of buffering yielded in the negotiation. After the streaming has once started, the determination in Step S509 is skipped.

If it is determined in Step S509 that there is a sufficient amount of data accumulated in the memory to start the streaming playback, then in Step S510, the personal computer 100 determines whether it is time to start the frame. If the personal computer 100 receives the frame start flag in Step S508 and it is determined in Step S510 that it is time to start the frame, then in Step S511, the personal computer 100 decodes the image data corresponding to one frame. In Step S512, the personal computer 100 determines whether the decoded image data corresponding to one frame is acquired. If it is determined in Step S512 that the decoded image data corresponding to one frame has been acquired, in Step S513, the personal computer 100 displays the frame in a display (not shown) to update the displayed image. If it is determined in Step S512 that the decoded image data corresponding to one frame has not been acquired, the process returns to Step S510. The personal computer 100 decompresses and displays the streaming data at timing substantially equal to the frame frequency of the digital video camera 102 by subsequently repeating the above process.

The personal computer 100 may play back the audio data through a phase locked loop (PLL) based on the frame frequency of the digital video camera 102, received from the endpoint 2 of the USB device. Alternatively, the personal computer 100 may acquire video playback timing and audio playback timing from an MPEG header to play back the audio data in synchronization with the playback of the video based on the acquired timing information.

Figure 6:
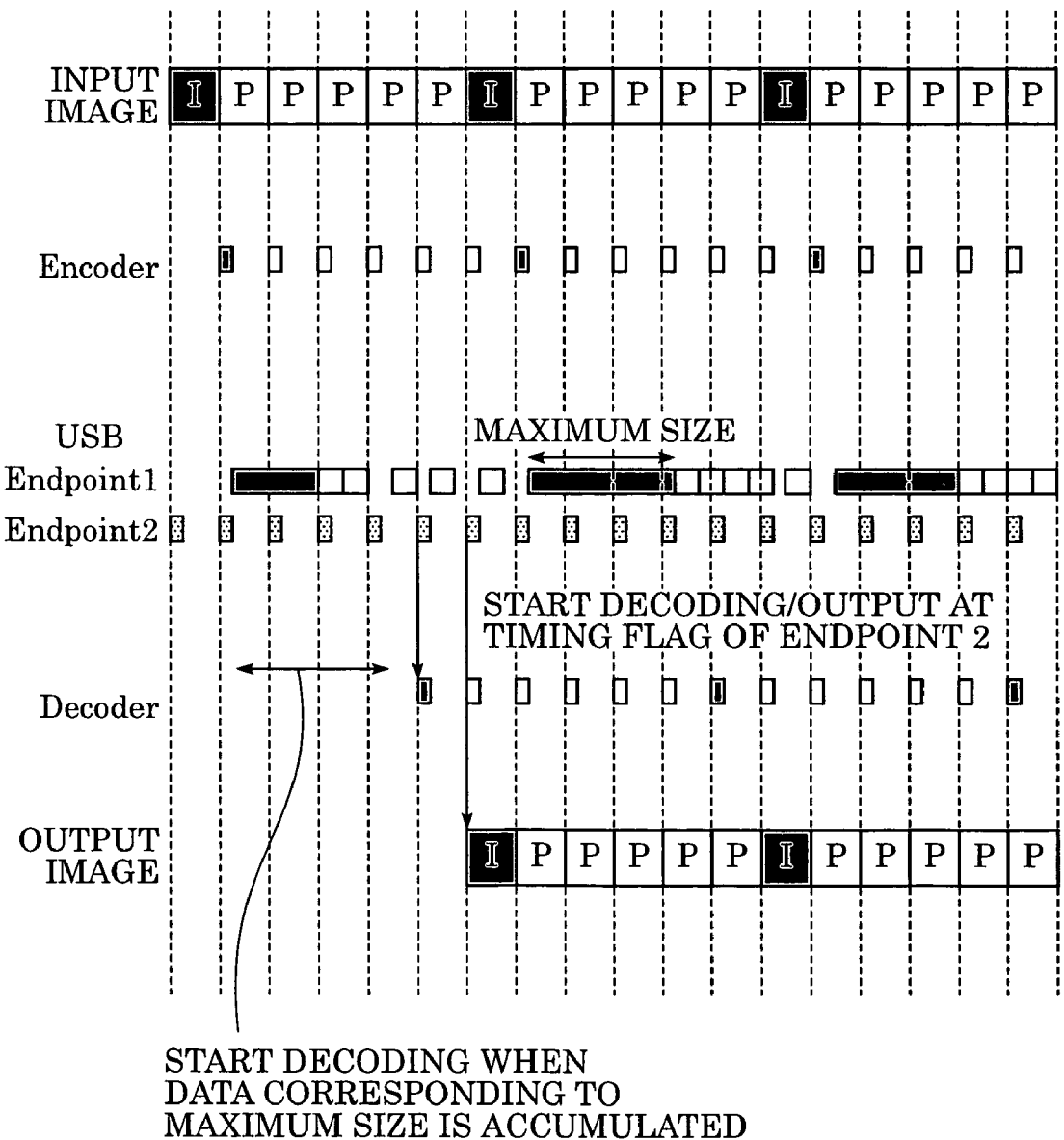
FIG. 6 illustrates operation timing of the digital video camera and the personal computer and transfer timing of a USB cable, according to the first embodiment.

FIG. 6 illustrates inputting timing and encoding timing of the digital video camera 102, transfer timing of the USB cable 101, and decoding timing and display timing of the personal computer 100, when the playback of the streaming data including I frame and the P frame is performed in the manner described above.

As shown in FIG. 6, since the frame of an output image is updated in synchronization with the frame start flag acquired from the endpoint 2, the frame period of the image data in the digital video camera 102 can be synchronized with the frame period of the displayed image in the personal computer 100 to easily avoid buffer under-run and buffer over-run of the transferred data in the USB connection.

A second embodiment of the present invention is described next.

The streaming in the downstream direction is described according to the second embodiment of the present invention while the streaming in the upstream direction is described according to the first embodiment of the present invention.

Figure 7:
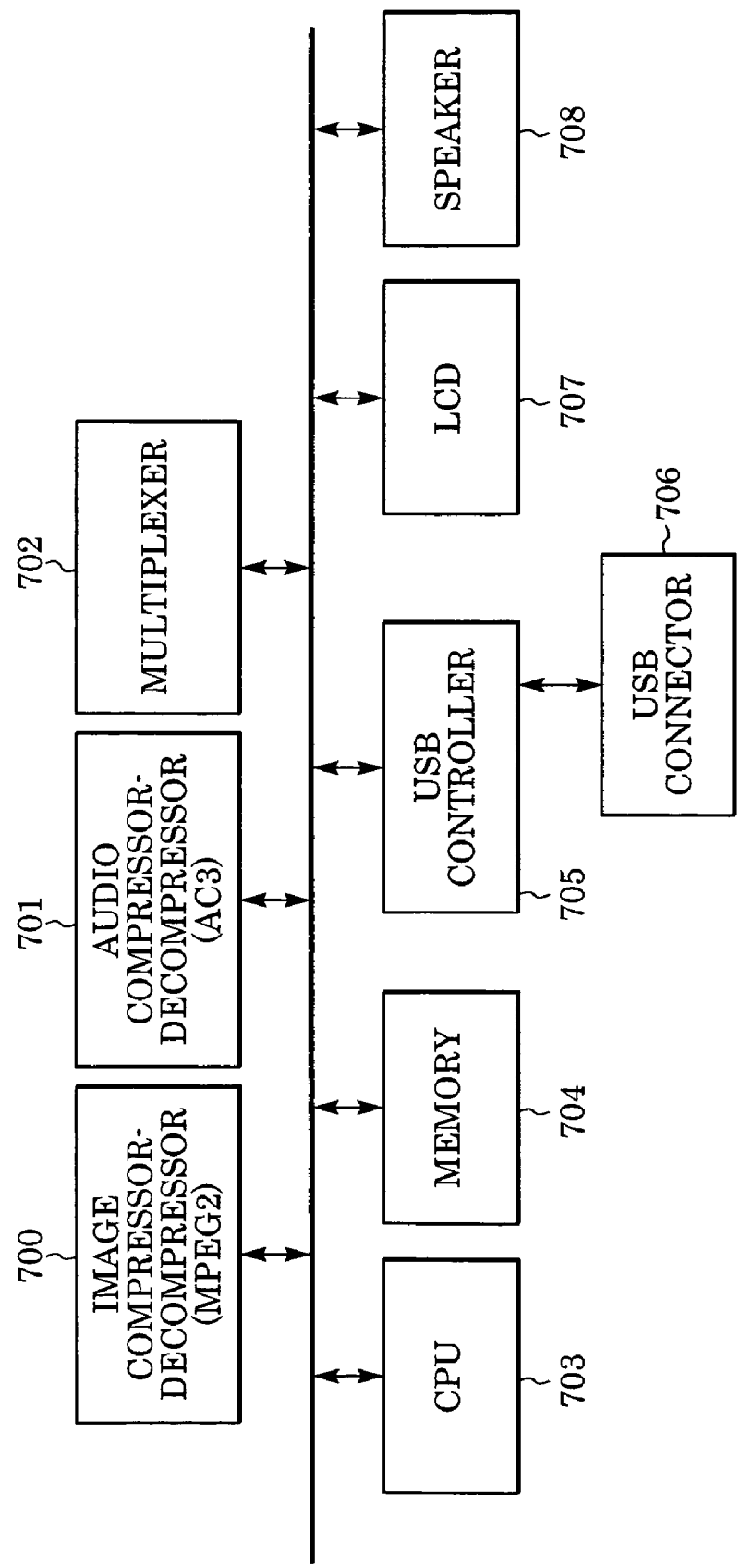
FIG. 7 is a block diagram showing the structure of a digital video camera according to a second embodiment of the present invention.

FIG. 7 is a block diagram showing the structure of the digital video camera 102 according to the second embodiment.

Referring to FIG. 7, the digital video camera 102 includes an image compressor-decompressor 700, an audio compressor-decompressor 701, a multiplexer 702, a CPU 703, a memory 704, a USB controller 705, a USB connector 706, a liquid crystal display (LCD) 707, and a speaker 708. The image compressor-decompressor 700 decompresses MPEG2 image data into an image signal. The audio compressor-decompressor 701 decompresses audio data encoded in, for example, the AC3 format. The multiplexer 702 separates the data multiplexed into, for example, the MPEG2-TS packet into image and audio streams. The CPU 703 controls the digital video camera 102 in accordance with a control program stored in the memory 704. The memory 704 is also used for temporarily storing the image data and the audio data. The USB connector 706 is used for connecting and disconnecting the digital video camera 102 to and from the USB cable 101. The LCD 707 displays the image signal. The speaker 708 plays back the audio signal.

FIG. 8 shows the structure (first-in first-out (FIFO) method for USB transfer) of endpoints of the USB controller 705 in the digital video camera 102 according to the second embodiment. An endpoint 0, which is a default control endpoint of a USB device, is used to perform negotiation when the USB device is connected and to transmit and receive an instruction to start streaming etc. An endpoint 1 is an isochronous endpoint used for receiving MPEG2-TS downstream data. An endpoint 2 is an isochronous endpoint used for transmitting the frame frequency of the digital video camera 102 to the personal computer 100. Communication with a USB device is accomplished through a pipe which is a logical association between an endpoint and software running on the host device. Here, a first pipe accomplishes communication associated with the first endpoint (i.e., transferring the MPEG2-TS downstream data) and a second pipe accomplishes communication associated with the second endpoint (i.e., transferring the frame frequency of the digital video camera).

Figure 9A:
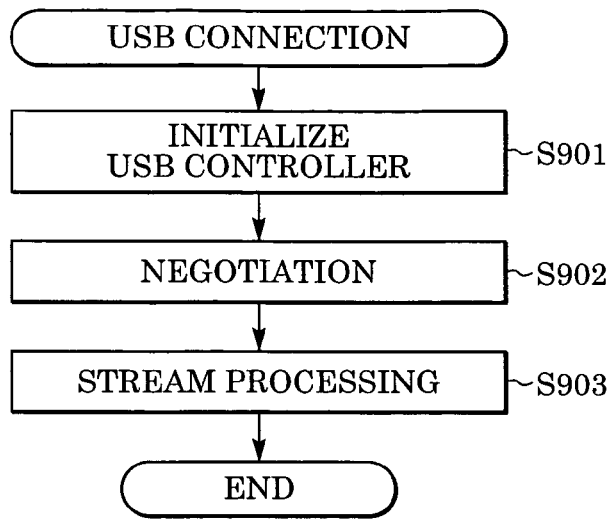
Figure 9B:
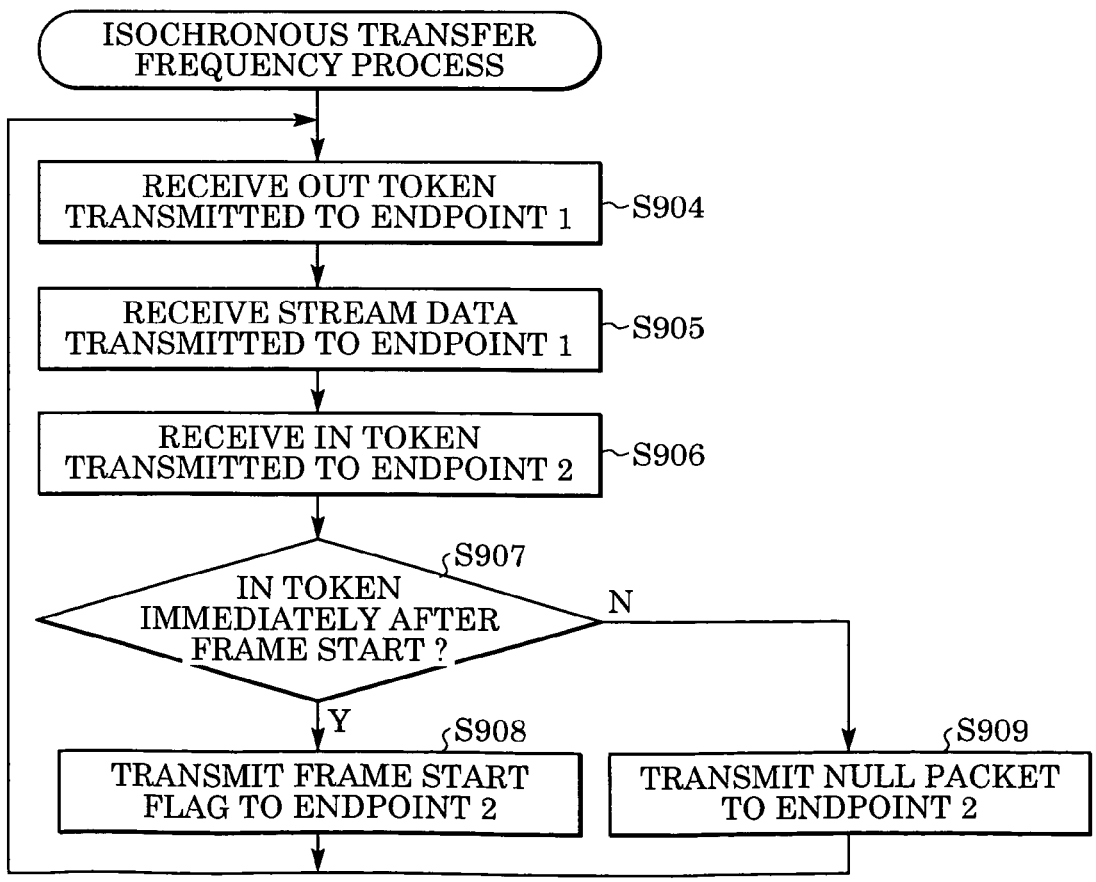

FIGS. 9A to 9C are flowcharts showing streaming processes of the digital video camera 102 according to the second embodiment. The streaming processes are described below with reference to FIGS. 7 and 9A to 9C. Upon startup, a compressed program stored in a flash memory (not shown) is decompressed and extracted in the memory 704. The CPU 703 operates in accordance with the program stored in the memory 704.

A USB connection process is described next with reference to FIG. 9A.

When the USB cable 101 is connected to the USB connector 706, the process in FIG. 9A is started. In Step S901, the USB controller 705 detects the connection to the USB cable 101 and notifies the CPU 703 of the connection to the USB cable 101. The CPU 703 performs initialization necessary for the USB controller 705 and, then, controls the USB controller 705 to perform pull-up connection to the personal computer 100.

In Step S902, the personal computer 100, which is a USB host and which is pull-up connected to the digital video camera 102 being a USB device, enters into negotiation with the digital video camera 102.

The digital video camera 102, which receives a negotiation request, creates descriptor information (USB connection information) in accordance with the connection mode shown in FIG. 8 in the memory 704 and transfers the descriptor information in response to the negotiation request from the personal computer 100. In the negotiation, the digital video camera 102, which is a USB device, notifies the personal computer 100, which is a USB host, of a streaming buffer size, which the digital video camera 102 can allocate in the memory 704. The same buffer size as in the first embodiment is required in the second embodiment.

In Step S903, the personal computer 100 issues the Set_Interface command upon start of the streaming to change the Alternate setting and notifies the digital video camera 102 of the start of the streaming. The digital video camera 102, which is notified of the start of the streaming, performs in parallel a transfer process in accordance with the frequency of USB isochronous transfer, shown in FIG. 9B, and a process of decompressing and displaying the streaming data, in accordance with the frame frequency, shown in FIG. 9C. The digital video camera 102 repeats the parallel processing until it is notified of the end of the streaming by the personal computer 100 with the Set_Interface command.

The transfer process in accordance with the frequency of USB isochronous transfer is described next with reference to FIG. 9B.

In Step S904, the digital video camera 102 receives an OUT token transmitted to the endpoint 1 and, then, attempts to receive streaming data transmitted from the personal computer 100. In Step S905, the digital video camera 102 acquires the streaming data transmitted from the personal computer 100 in the form of the USB packet. In Step S906, the digital video camera 102 receives an IN token transmitted to the endpoint 2. In Step S907, the digital video camera 102 determines whether the received IN token is the IN token immediately after the frame start timing.

If it is determined in Step S907 that the received IN token is the IN token immediately after the frame start timing, in Step S908, the digital video camera 102 transmits, from the endpoint 102 to the personal computer 100, a flag indicating that it is time to start the frame in the digital video camera 102.

If it is determined in Step S907 that the received IN token is not the IN token immediately after the frame start timing, then in Step S909, the digital video camera 102 transmits a null packet from the endpoint 2 to the personal computer 100.

Sequentially repeating the above processes allows the digital video camera 102 to transfer the streaming data and to transmit the frame frequency of the digital video camera 102 to the personal computer 100.

The process of decompressing and displaying the streaming data in accordance with the frame frequency is described next with reference to FIG. 9C.

In Step S910, the digital video camera 102 determines whether there is a sufficient amount of data accumulated in the memory 704 to start the streaming playback. This determination is based on the amount of buffering required to be transmitted in the negotiation. If it is determined in Step S910 that there is a sufficient amount of data accumulated in the memory 704 to start the streaming playback, processing proceeds to Step S911. After the streaming has started, the determination in Step S910 is skipped.

In Step S911, the digital video camera 102 determines whether it is time to start the frame in the digital video camera 102. If it is determined in Step S911 that is time to start the frame, in Step S912, the digital video camera 102 decodes the MPEG stream stored in the memory 704 and acquires the decoded image data corresponding to one frame. In Step S913, the digital video camera 102 determines whether the decoded image data corresponding to one frame has been acquired. If it is determined in Step S913 that the decoded image data corresponding to one frame has been acquired, in Step S914, the digital video camera 102 displays the frame in the LCD 707 as the streaming image. If it is determined in Step S913 that the decoded image data corresponding to one frame has not been acquired, the process returns to Step S911. Similarly, the audio data is decompressed in the audio compressor-decompressor 701 based on the frame frequency and is output from the speaker 708.

Sequentially repeating the above processes allows the downstream data to be played back in the digital video camera 102.

The operation of the personal computer 100, which is a USB host, is described next.

Figure 10A:
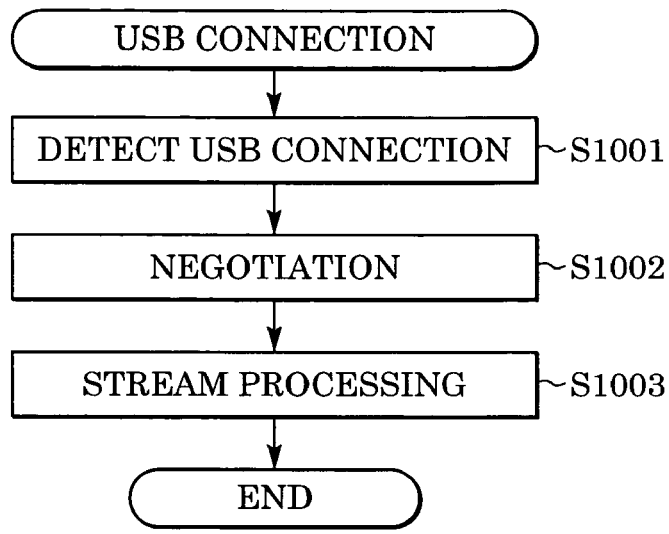
FIGS. 10A to 10C are flowcharts illustrating the operation of the personal computer according to the second embodiment.
Figure 10B:
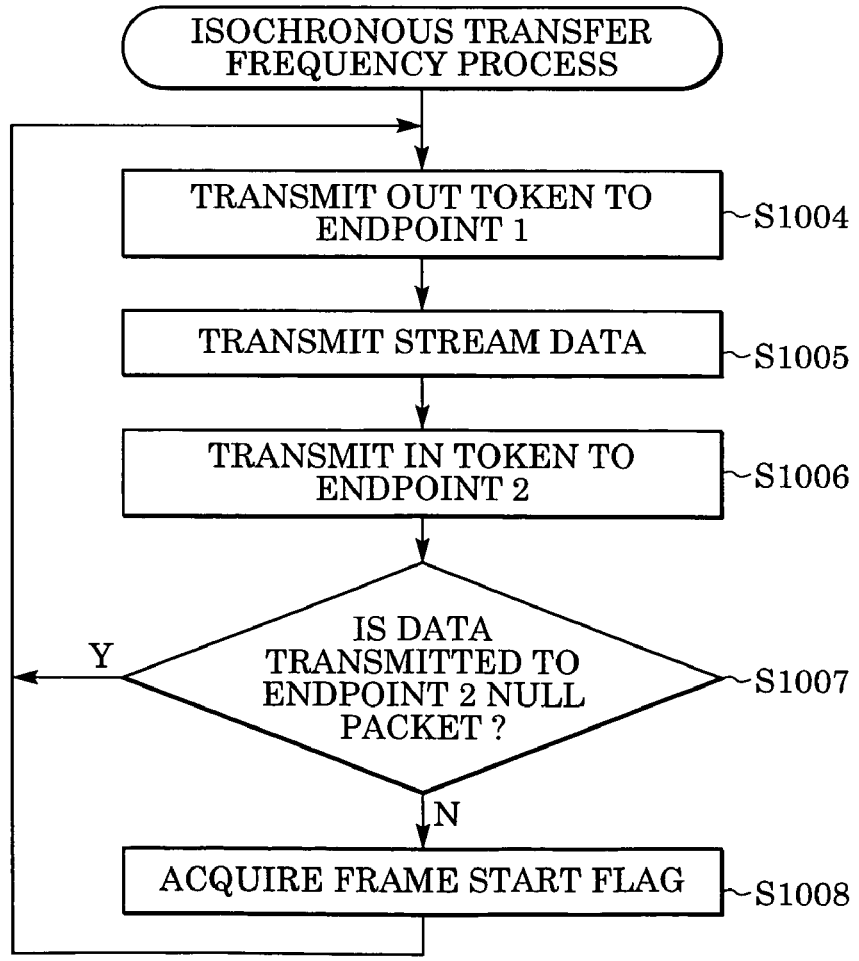
Figure 10C:
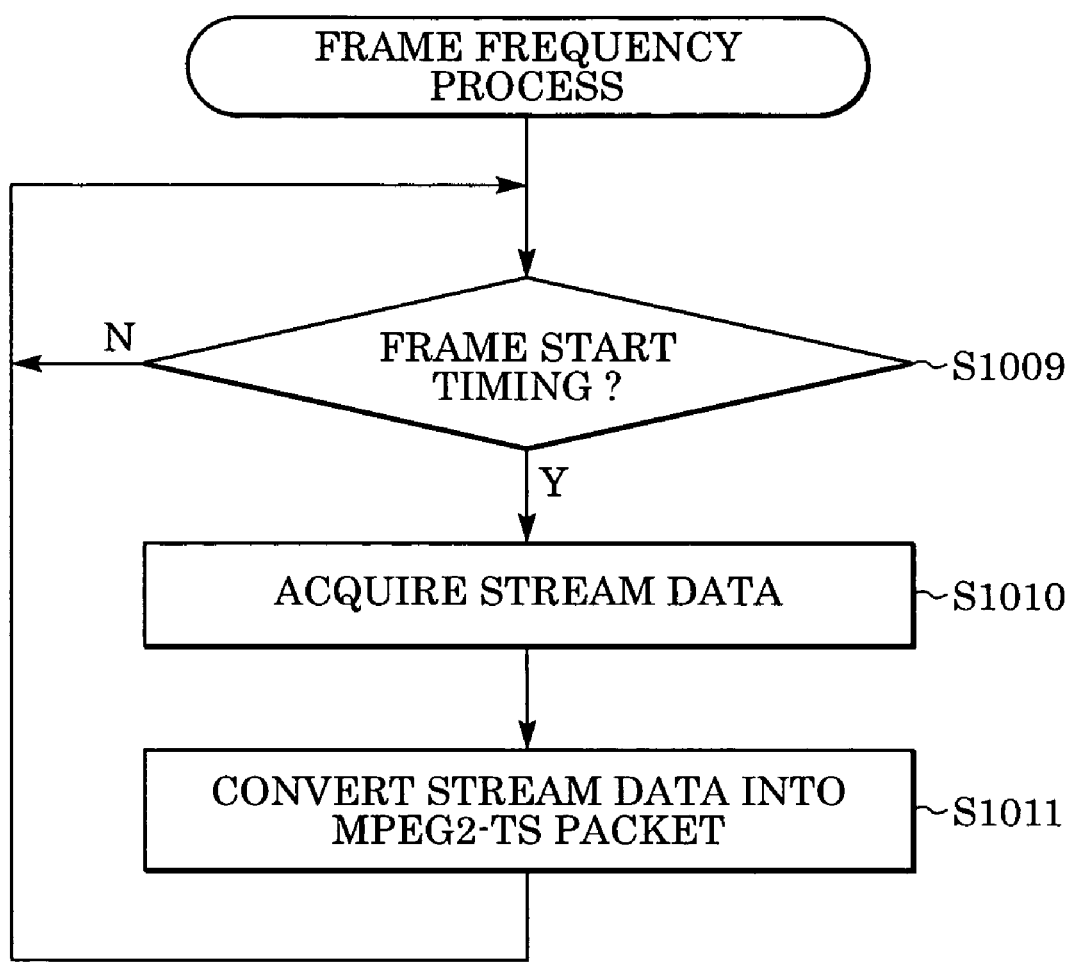

FIGS. 10A to 10C are flowcharts showing streaming processes of the personal computer 100. The operation of the personal computer 100 is described next with reference to FIGS. 10A to 10C.

Referring to FIG. 10A, when the USB cable 101 is connected to the personal computer 100, the personal computer 100 applies a voltage to a VBUS (USB power line) on the USB cable 101. In Step S1001, the digital video camera 102 detects the voltage applied to the VBUS and performs the pull-up connection to the personal computer 100. In Step S1002, the personal computer 100 performs a predetermined negotiation operation. The personal computer 100 passes the maximum bit length of one frame and the number of times the B frame continuously occurs, with respect to the streaming data, to the digital video camera 102. The digital video camera 102 allocates a buffer size appropriate for the passed values in a memory 704.

In Step S1003, the personal computer 100 receives a streaming start request from an application (not shown). The personal computer 100 issues the Set_Interface command to the digital video camera 102 to notify the digital video camera 102 of the start of the streaming. The personal computer 100, which has started the streaming, performs in parallel a process of acquiring streaming data, in accordance with the frequency of USB isochronous transfer, shown in FIG. 10B, and a process of generating the streaming data, in accordance with the frame frequency, shown in FIG. 10C. The personal computer 100 repeats the parallel processing until it receives a termination request from the application (not shown).

The process of acquiring the streaming data, in accordance with the frequency of USB isochronous transfer, is described next with reference to FIG. 10B.

In Step S1004, the personal computer 100 transmits an OUT token to the endpoint 1 of the digital video camera 102. In Step S1005, the personal computer 100 transmits the streaming data in the form of the USB packet to the digital video camera 102.

In Step 1006, the personal computer 100 transmits an IN token to the endpoint 2 of the digital video camera 102. In Step S1007, the personal computer 100 determines whether the data supplied from the endpoint 2 of the digital video camera 102 in response to the IN token is null data.

If it is determined in Step S1007 that the supplied data is not null data and includes a flag indicating the frame start timing, in Step S1008, the personal computer 100 acquires the frame start flag. If it is determined in Step S1007 that the supplied data is null data, the process returns to Step S1004. Subsequently repeating the above process allows the personal computer 100 to transmit the streaming data to the digital video camera 102 and to acquire the frame frequency of the digital video camera 102 from the digital video camera 102.

The process of generating the streaming data, in accordance with the frame frequency, is described next with reference to FIG. 10C.

In Step S1009, the personal computer 100 detects the frame start timing of the digital video camera 102 from the frame start flag acquired in Step S1008. If the frame start timing of the digital video camera 102 is detected, in Step S1010, the personal computer 100 acquires the streaming data in a memory (not shown). In Step S1011, the personal computer 100 generates the MPEG2-TS packet from the streaming data in the memory. The personal computer 100 transmits the streaming data at timing substantially equal to the frame frequency of the digital video camera 102 by subsequently repeating the above process.

The personal computer 100 may transmit the audio data through a phase locked loop (PLL) based on the frame frequency of the digital video camera 102, received from the endpoint 2. The digital video camera 102 may acquire video playback timing and audio playback timing from a MPEG header to play back the audio data in synchronization with the playback of the video data based on the acquired timing information.

Although a case in which the image data stream and the audio data stream are transferred in the MPEG2-TS format is described in the above embodiments, the present invention is not limited to this case. The data in an MPEG1 format, an MPEG2-program stream (MPEG2-PS) format, a digital video (DV) format, an MPEG4 format, a motion JPEG format, and other formats may be transferred. This is because the buffer over-run and under-run can be avoided, regardless of the image encoding format, as long as the moving image data at the transmitter side has the same frame frequency as the moving image data at the receiver side. When the frame frequency or clocks can be transmitted and received from the endpoint 2, as described in the above embodiments, the frame frequency at the transmitter side is substantially equal to the frame frequency at the receiver side, thus avoiding the buffer over-run and under-run.

Although a case in which the image data and the audio data in the MPEG2-TS format are transmitted is described in the above embodiments, only the image data or the audio data in the MPEG-TS format may be transmitted. In the case of transmitting only the audio data, similarly transferring the sampling frequency or the like of the audio data, instead of the frame frequency in the above embodiment, allows the sampling clock at the transmitter side to be synchronous with that at the receiver side. The same advantages as in the image data can be obtained in this case.

Although the digital video camera is exemplified in the above embodiments, the present invention is not limited to the digital video camera. The present invention is embodied by any electronic device that can be connected to the personal computer though the USB interface or an interface similar to the USB interface.

Although the data transfer through the USB cable between the digital video camera and the personal computer is described in the above embodiments, the present invention is embodied by any data transfer method through the USB interface or an interface similar to the USB interface.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-143812 filed May 13, 2004, which is hereby incorporated by reference herein.

What is claimed is:

1. A Universal Serial Bus (USB) device which transmits moving image data to a USB host that displays the moving image data transmitted from the USB device, comprising:

an imaging unit configured to output moving image data;

a communication unit configured to set a first pipe for transmitting the moving image data and a second pipe for transmitting a frame start information indicating a start of respective frames of the moving image data in a transmission path if the USB device is connected with the USB host, to transmit the moving image data to the USB host through the first pipe and to transmit the frame start information to the USB host through the second pipe, the communication unit transmitting the moving image data and the frame start information through the first pipe and the second pipe in parallel; and a controller configured to control when to transmit the moving image data to the USB host through the first pipe if a transmission instruction of the moving image data is received from the USB host through the first pipe, and when to transmit the frame start information to the USB host through the second pipe if a transmission instruction of the frame start information is received from the USB host through the second pipe so that the moving image data displayed by the USB host has the same frequency as the moving image data output by the imaging unit.

2. The USB device according to claim 1, wherein the transmission instruction of the frame start information is transmitted from the USB host periodically, and the controller controls the communication unit to transmit the frame start information in response to the transmission instruction of the frame start information which is first issued after the frame of the moving image date is started.

3. The USB device according to claim 2, wherein the controller controls the communication unit so as to transmit null data in response to the transmission instruction other than the transmission instruction of the first frame start information.

4. The USB device according to claim 1, wherein the transmission instruction of the moving image data is transmitted from the USB host periodically.

5. The USB device according to claim 1, wherein the imaging unit comprises an encoding unit configured to encode the moving image data in accordance with Motion Picture Experts Group (MPEG system, and the communication unit transmits the encoded moving image data.

6. The USB device according to claim 1, wherein the imaging unit obtains image data of one frame periodically at a timing of frame start and outputs the moving image data by using the obtained image data.

7. A data transmitting apparatus which transmits moving image data to a Universal Serial Bus (USB) host, wherein the transmitting apparatus sets a first pipe for transmitting the moving image data and a second pipe for transmitting a frame start information indicating a start of respective frames of the moving image data in a transmission path if a, USB device is connected with the USB host and transmits the moving image data to the USB host through the first pipe in parallel with the frame start information to the USB host through the second pipe, and wherein the transmitting apparatus transmits the moving image data to the USB host through the first pipe if a communication unit receives a transmission instruction of the moving image data from the USB host through the first pipe, and transmits the frame start information to the USB host through the second pipe if the communication unit receives a transmission instruction of the frame start information from the USB host through the second pipe so that the moving image data displayed by the USB host has the same frequency as the moving image data output by an imaging unit.

8. A Universal Serial Bus (USB) device which receives moving image data from a USB host, comprising:
a display unit configured to display the moving image data received from the USB host;
a communication unit configured to set a first pipe for receiving the moving image data and a second pipe for transmitting a frame start information indicating an update timing of a frame of the moving image data displayed by the display unit in a transmission path if the USB device is connected with the USB host, to receive the moving image data from the USB host through the first pipe and to transmit the frame start information to the USB host through the second pipe; and
a controller configured to control when to receive the moving image data from the USB host through the first pipe if a transmission instruction of the moving image data is received from the USB host through the first pipe, and when to transmit the frame start information to the USB host through the second pipe if a transmission instruction of the frame start information is received from the USB host through the second pipe so that the moving image data transmitted by the USB host has the same frame frequency as the moving image data displayed by the display unit.

9. The USB device according to claim 8, further comprising a memory to store the moving image data received by the communication unit, wherein the display unit reads out image data of one frame from the memory at the update timing of a frame and updates the frame with the read-out image data.

10. The USB device according to claim 8, wherein the moving image data is encoded in accordance with Motion Picture Experts Group (MPEG) system and the USB device further comprises a decoding unit configured to decode the moving image data received by the communication unit.

11. A communicating system comprising a Universal Serial Bus (USB) device and a USB host, wherein the USB device sets a first pipe for transmitting the moving image data and a second pipe for transmitting a frame start information indicating a start of respective frames of the moving image data in a transmission path if the USB device is connected with the USB host, and transmits the moving image data to the USB host through the first pipe in parallel with the frame start information to the USB host through the second pipe, wherein the USB device transmits the moving image data to the USB host through the first pipe if a communication unit receives a transmission instruction of the moving image data from the USB host through the first pipe, and transmits the frame start information to the USB host through the second pipe if the communication unit receives a transmission instruction of the frame start information from the USB host through the second pipe, and wherein the USB host transmits the transmission instruction of the moving image data to the USB device through the first pipe and receives the moving image data from the USB device through the first pipe, and the USB host transmits the transmission instruction of the frame start information through the second pipe to update a display frame of the moving image data in accordance with the received frame start information so that the moving image data transmitted by the USB device has the same frame frequency as the moving image data displayed by a display unit.

12. A communicating system comprising a Universal Serial Bus (USB) device and a USB host, wherein the USB device displays the moving image data received from the USB host on a display device, sets a first pipe for receiving the moving image data and a second pipe for transmitting a frame start information indicating an update timing of a frame of the moving image data displayed on the display device in a transmission path if the USB device is connected with the USB host, receives the moving image data from the USB host through the first pipe, and transmits the frame start information to the USB host through the second pipe, wherein the USB device receives the moving image data from the USB host through the first pipe if a communication unit receives a transmission instruction of the moving image data from the USB host through the first pipe, and transmits the frame start information to the USB host through the second pipe if the communication unit receives a transmission instruction of the frame start information from the USB host through the second pipe, and wherein the USB host generates the moving image data in accordance with the frame start information received through the second pipe, transmits the transmission instruction of the moving image data and the generated moving image data to the USB device through the first pipe, and the USB host transmits the transmission instruction of the frame start information to the USB device through the second pipe and receives the frame start information through the second pipe so that the moving image data transmitted by the USB host has the same frame frequency as the moving image data displayed by the display device.

* * * * *